United States Patent [19]
Robinson

[11] Patent Number: 5,964,078
[45] Date of Patent: Oct. 12, 1999

[54] MULTIPLE IMPLEMENT TOW BAR ASSEMBLY

[76] Inventor: Larry P. Robinson, 8001 E. Farmers Ave., Amarillo, Tex. 79118

[21] Appl. No.: 09/017,022

[22] Filed: Feb. 2, 1998

Related U.S. Application Data

[63] Continuation-in-part of application No. 08/691,800, Aug. 2, 1996, Pat. No. 5,713,192.

[51] Int. Cl.$^6$ ................................................. A01D 46/08
[52] U.S. Cl. ........................... 56/13.5; 56/15.1; 56/15.5; 56/16.4 R; 56/341; 56/DIG. 9; 56/DIG. 11; 56/DIG. 14
[58] Field of Search .................................... 56/14.7, 15.1, 56/15.2, 15.5, 16.4 R, 343, 341, DIG. 9, DIG. 11, DIG. 14, 13.5

[56] References Cited

U.S. PATENT DOCUMENTS

| | | |
|---|---|---|
| 3,343,849 | 9/1967 | Priddy . |
| 3,437,152 | 4/1969 | Barrentine . |
| 3,760,575 | 9/1973 | Moore ................................ 56/13.5 X |
| 4,304,086 | 12/1981 | Stuchl ................................ 56/13.5 X |
| 5,099,635 | 3/1992 | Butkovich et al. ...................... 56/13.5 |

FOREIGN PATENT DOCUMENTS 4108924 9/1992 Germany .

*Primary Examiner*—Christopher J. Novosad
*Attorney, Agent, or Firm*—Dowell & Dowell, P.C.

[57] ABSTRACT

A tow bar assembly for a tractor which enables up to three implements to be simultaneously pulled through a field utilizing a conventional hitch of the tractor. The tow bar assembly includes hitch dollies which are pivotally mounted so as to be moveable about both horizontal and vertical axes to a primary support beam and a pair of outrigger beams which are pivotally connected at opposite ends of the primary support beam in such a manner that the dollies are permitted to follow the natural terrain when the tow bar assembly is in use. Implements, such as hay balers, may be selectively hitched to the dollies.

20 Claims, 4 Drawing Sheets

Fig.1

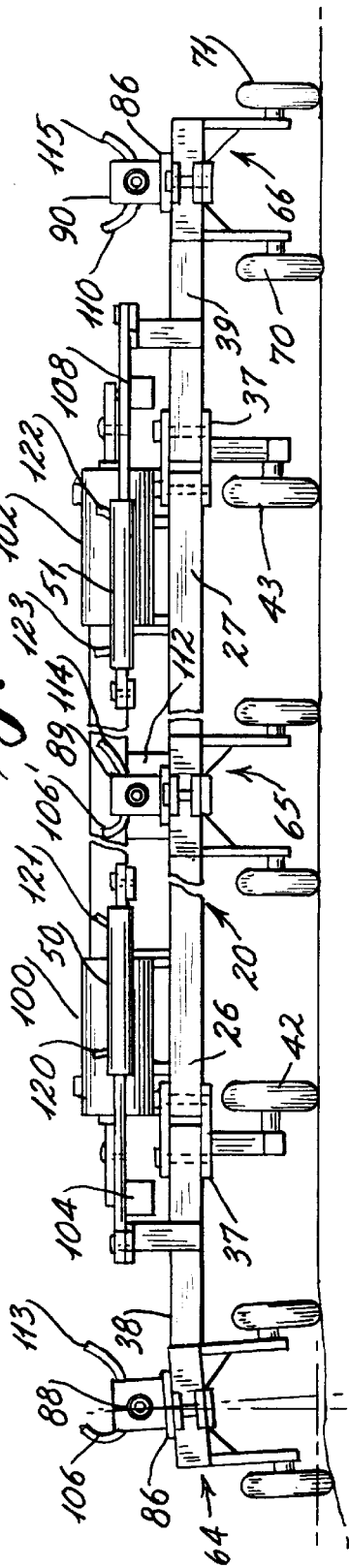
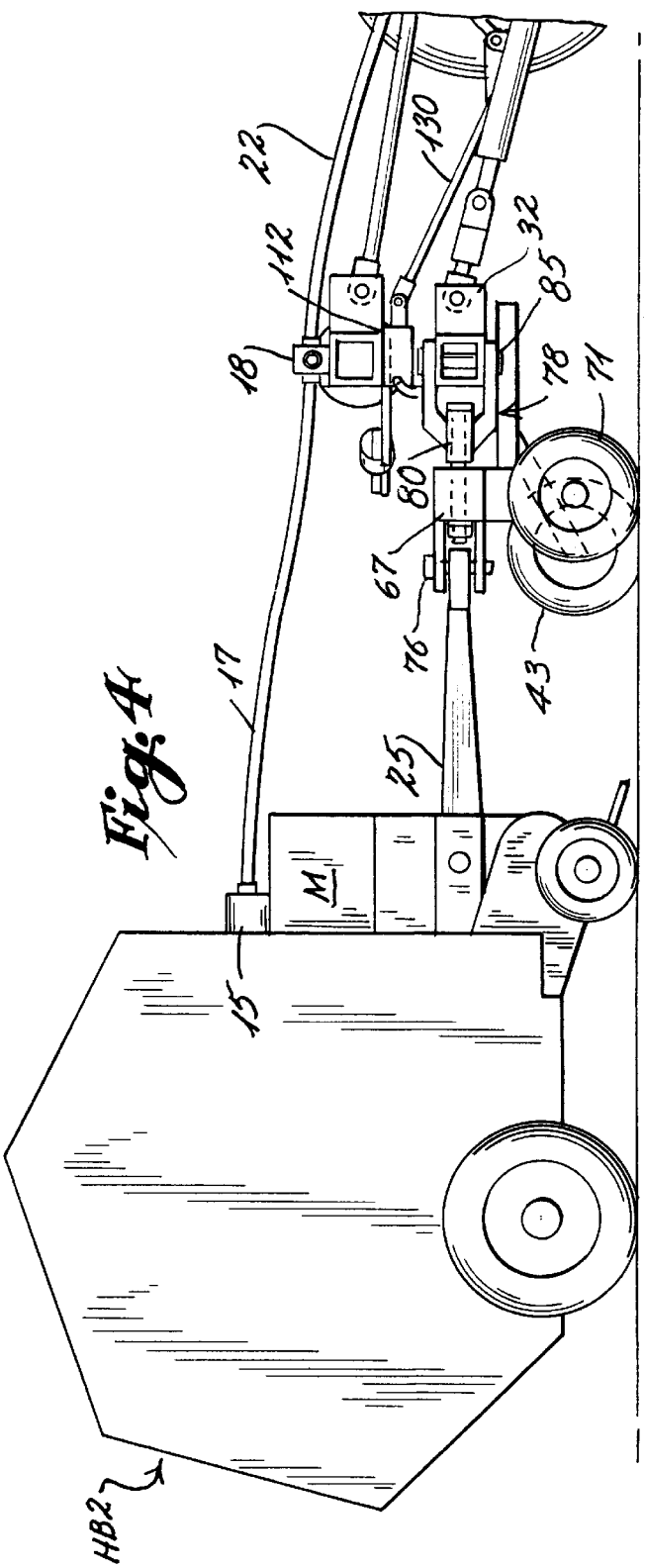

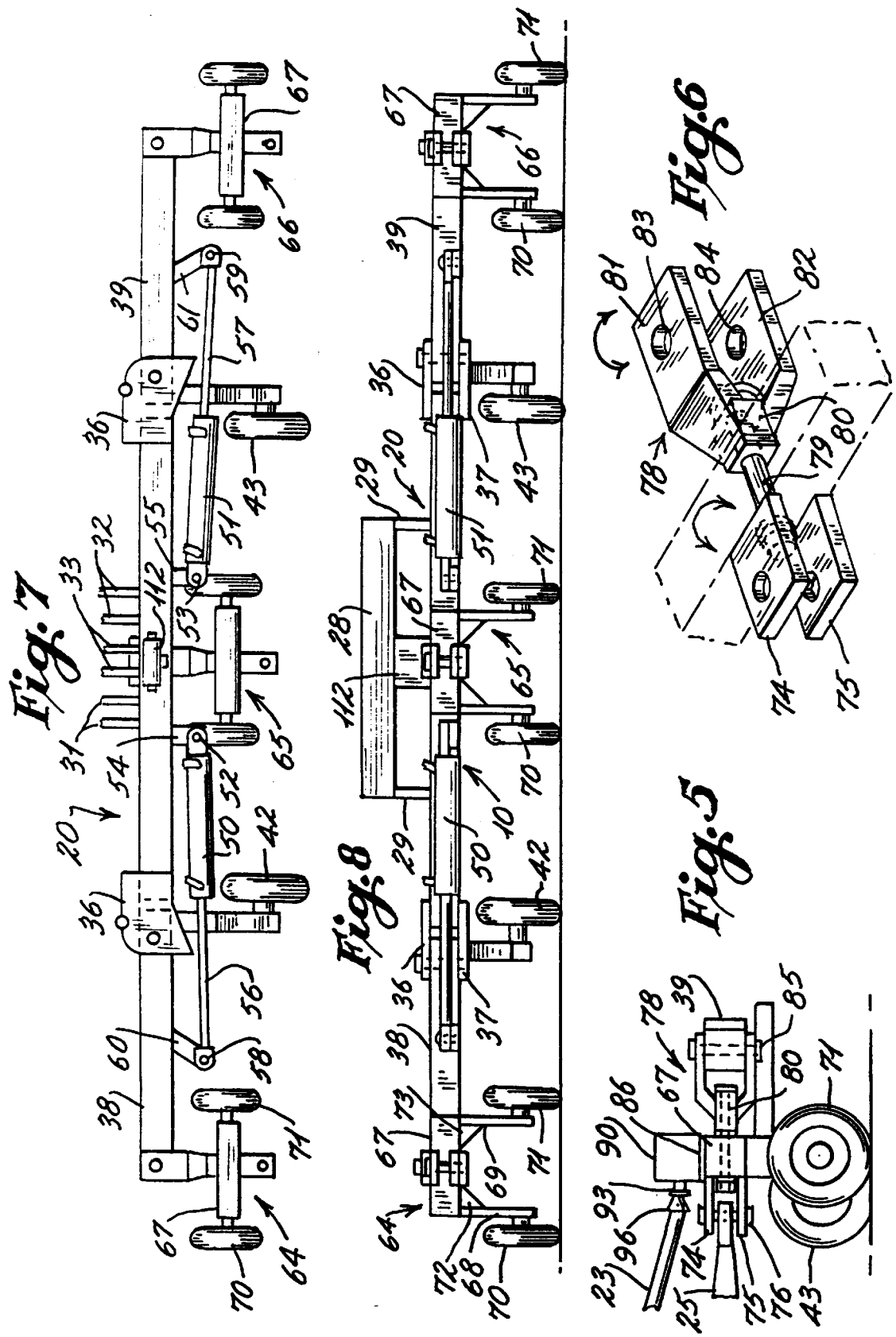

MULTIPLE IMPLEMENT TOW BAR ASSEMBLY

CROSS-REFERENCE TO RELATED APPLICATIONS

This application is a continuation-in-part application of U.S. Ser. No. 08/691,800 filed Aug. 2, 1996, now U.S. Pat. No. 5,713,192 in the name of the same inventor and entitled TOW BAR ASSEMBLY FOR MULTIPLE HAY BALERS.

BACKGROUND OF THE INVENTION

This invention is generally directed to agricultural implement tow bars of the type which enable a plurality of implements to be pulled by a single tractor and, more particularly, to a tow bar assembly having adjustable outrigger beams from at least one has a dolly connected thereto to which an implement, such as a hay baler, may be selectively hitched in such a manner as to enable the implement to track the natural contour of the ground over which the implement passes. The tow bar assembly is further of the type which allows the lateral spacing between the implements to be altered during movement through a field to adjust for spacing of windows, and to facilitate over-the-road transport and vehicle turning.

After hay and other vegetable matter has been cut and/or processed in the field, it is normally raked into windrows for purposes of facilitating baling of the material into either round or rectangular bales. Conventionally, a single hay baler is pulled through a field by a tractor or similar vehicle with the hay baler passing over a single windrow at a time. This requires repeated passes of the tractor through the field, thereby consuming not only fuel but also requiring multiple hours of vehicle operation and operator worktime.

In some agricultural environments, it has been proposed to utilize multiple implements pulled by a single tow bar to increase the rate of harvesting. By way of example, in U.S. Pat. No. 5,099,635 to Butkovich et al., a system for harvesting cotton is disclosed in which a tow bar assembly is provided for simultaneously carrying a plurality of cotton harvesting units. In U.S. Pat. No. 3,437,152 to Barrentine, an agricultural implement for pulling stalks, such as corn stalks from which corn has been harvested, is disclosed for pulling and grinding the stalks of multiple rows of the stalks simultaneously.

Another example of agricultural implement incorporating multiple cutting units is disclosed in U.S. Pat. No. 4,304,086 to Stuchl wherein a lawnmowing attachment has a plurality of lawnmowing decks which are mounted in laterally spaced relationship with respect to one another in order to maximize the cutting width as the implement passes over an area being mowed.

There is an ever-increasing need to reduce costs associated with the baling of hay and other forage products. By enabling a plurality of farm implements, such as baling machines, to be operated simultaneously, not only is it possible to reduce man hours associated with the baling but the operating hours of the harvesting machinery would be considerably reduced, especially with respect to the powering units, such as tractors, which will effectively extend the overall life of such vehicles.

It should be noted at this point in this application that the term "hay baler" is utilized. It should be noted that "balers" are also conventionally used for baling other forage materials such as peanut vines and the like which are acceptable as fodder. The term "hay baler" is meant to be generic to all types of balers having the features which are described herein with respect to the Description of the Preferred Embodiment and are not limited to hay balers per se.

In applicant's co-pending U.S. application referenced above, a tow bar assembly for multiple hay balers is disclosed which enables up to three separate hay balers to be pulled by a single tow bar having a pair of pivotable outrigger beams associated therewith. The tow bar assembly further includes a hydraulic system which allows a plurality of pumps to be mounted thereon which are used to drivingly engage the drive inputs to each of the balers which are hitched to the tow bar assembly. In this manner, up to three hay balers may be powered and pulled by a single tractor in such a manner that the lateral spacing between the balers may be varied as they are pulled through a field or as required to facilitate turning at the end of rows and for further facilitating transport of the balers on conventional roadways. The tow bar assembly is particularly adapted for use with smaller hay balers of the type which require a drive input from a power source and are therefore normally smaller and lighter in weight than many self-powered hay balers which are currently in use in many areas. Conventional self-powered round hay balers weigh in excess of a ton and, when the additional weight of hay being rolled within the balers is added to the gross weight of the implement as it is pulled through the field, the load imparted to an implement hitch tongue becomes significant and generally prohibits the use of outrigger beams which are designed to permit only horizontal or lateral movement of an implement during use.

In view of the foregoing, there remains a need to provide a tow bar assembly for use with a plurality of implements, such as a plurality of self-powered hay balers, which enables the larger and heavier self-powered implements to be effectively pulled through a field utilizing a single tow bar assembly.

SUMMARY OF THE INVENTION

The present invention is directed to a tow bar assembly for use with tractors or other vehicles for enabling a plurality of agricultural implements, such as hay balers, to be simultaneously conveyed through a field. The tow bar assembly includes a primary support beam having outer portions to which outrigger beams are pivotally secured. Actuation devices are utilized between the primary support beam and the outrigger beams to enable the outrigger beams to be moved from a position wherein they are in substantial alignment with the elongated axis of the primary support beam to an orientation substantially perpendicularly with respect thereto. A hitch dolly is connected by a universal swivel joint to at least one and preferably each of the outrigger beams. Each dolly includes at least one ground-engaging wheel and an appropriate hitch to which an implement, such a hay baler, may be selectively secured. In some embodiments, the dolly may also be secured to the primary support beam so as to be intermediate the dollies associated with the outrigger beams.

In the preferred embodiment, each dolly includes a pair of spaced ground-engaging wheels for stabilizing the frame of the dolly and an appropriate hitch for an agricultural implement to be secured.

Although the tow bar assembly of the present invention is specifically designed for use with heavier self-powered agricultural implements, in some embodiments, one or more lighter weight implements may be towed and receive drive input power from a hydraulic system associated with the tow bar assembly. In these embodiments, hydraulic drive motors may be mounted on the outrigger beams and/or primary support beam, however, when the dollies are in use, the drive motors should be mounted to the dollies.

Motors which are mounted to either the dollies or the primary support beam or outrigger beams, when the dollies are not in use, are hydraulically driven utilizing hydraulics which may include fluid reservoirs mounted to the primary support beam and which are connected to a pump for distributing hydraulic fluid to each of the motors. In a preferred embodiment, the primary support beam also functions as a hydraulic fluid reservoir and heat exchange chamber for cooling hydraulic fluid during operation of any agricultural implement being towed by the tow bar assembly.

The actuation devices are preferably hydraulic cylinders which are secured to the outrigger beams and are directly connected to the hydraulic system of the vehicle so as to be controllable from the cab of the vehicle whereby the operator may change the angular displacement of the outrigger beams relative to the primary support beam as the implement is moved through a field to thereby allow selective positioning of the agricultural implements to adjust for spacing in windrows and to facilitate maneuverability without requiring that the vehicle be stopped.

In the preferred embodiment, a third agricultural implement, such as a hay baler, is towed utilizing a separate hitch is provided along the central portion of the primary support beam to which the tongue of the intermediately positioned implement is pivotally secured. Such separate hitch may be associated with a central dolly. A drive input may also be provided for an intermediate implement by mounting a hydraulic motor to the primary support beam. This hydraulic motor may also be connected to the hydraulic system and pump associated with the motors associated with the outrigger beams.

In a further embodiment of the present invention, appropriate electrical interface panels are provided along the primary support beam for connecting the electrical controls on the self-powered implements, such as a round hay balers, to controls extending from the cab of the tractor. Appropriate control cables are provided between the implements and the interface panels mounted to the tow bar assembly and appropriate cables are extended from there to the cab of the tractor such that the operator of the tractor may manipulate the appropriate electrical controls associated with the implements from the interior of the cab.

It is the primary object of the present invention to provide a tow bar assembly which may be utilized to pull a plurality of agricultural implements simultaneously through a field in such a manner that the implements may follow the natural contour of the ground by providing universal hitch joints to connect the implements thereto.

It is yet another object of the present invention to enable a plurality of agricultural implements, such as self-powered hay balers, to be simultaneously pulled by a single tow bar assembly in such a manner that the lateral spacing between the implements may be changed while the implements are in motion and wherein electrical controls to the implements are interfaced so as to be accessible to the tractor operator from within the cab.

It is also an object of the present invention to provide a tow bar assembly for simultaneously towing a plurality of implements wherein one or more of the implements may receive driving power from a hydraulic system associated with the tow bar assembly and wherein the hydraulic system includes at least one pump which receives hydraulic fluid from a reservoir also associated with the tow bar assembly.

BRIEF DESCRIPTION OF THE DRAWINGS

The present invention will be better understood with reference to the attached drawings, wherein:

FIG. 1 is a top plan view of the tow bar assembly for multiple agricultural implements of the present invention illustrating the manner in which the tow bar is utilized to connect a plurality of hay balers to the hitch and hydraulic controls of a conventional tractor and showing the implements spaced at a maximum distance with respect to one another;

FIG. 3 is a partial front elevational view of the tow bar assembly of FIG. 1;

FIG. 4 is a cross-sectional view taken along line 4—4 of FIG. 1;

FIG. 5 is a cross-sectional view taken along line 5—5 of FIG. 1;

FIG. 6 is a perspective illustrational view of the universal pivot joint shown in FIG. 5;

FIG. 7 is a partial top plan view of the tow bar assembly of FIG. 1 without motors; and FIG. 8 is a view similar to FIG. 3 except not including any drive motors associated with the dollies or primary support and outrigger beams.

DESCRIPTION OF THE PREFERRED EMBODIMENT

Figure 1:
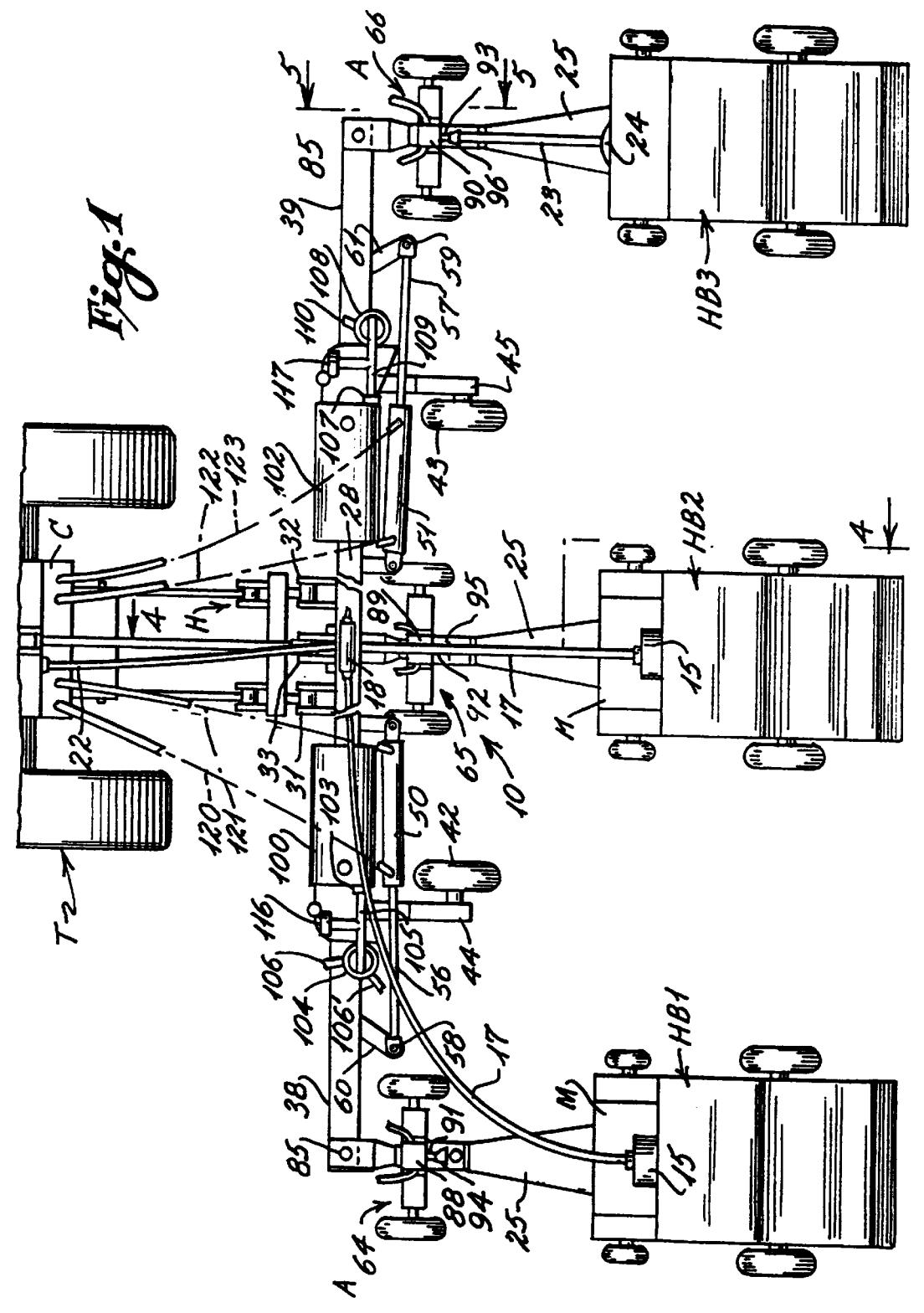
Figure 2:
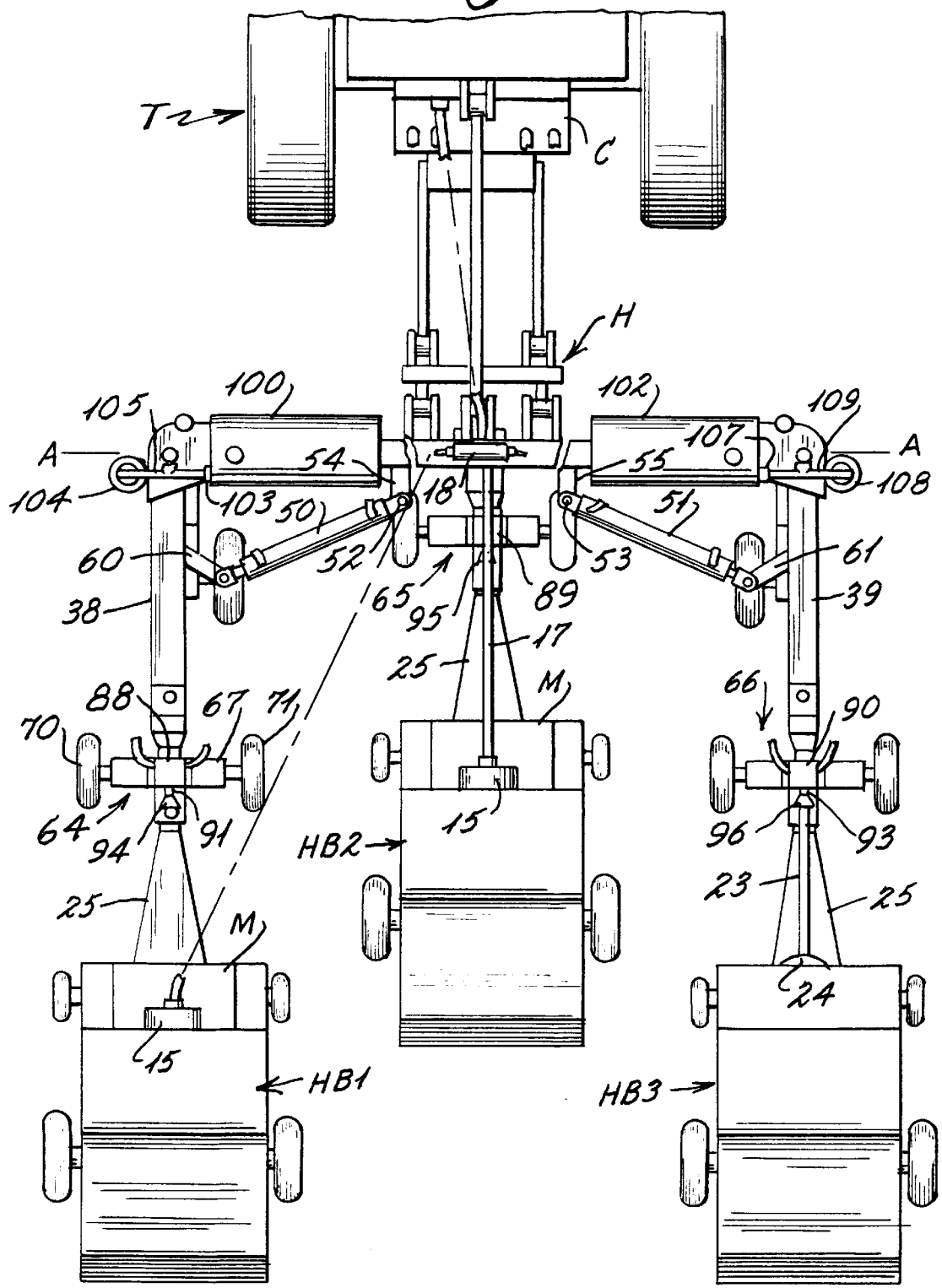
FIG. 2 is a top plan view of the tow bar assembly of FIG. 1 showing the outrigger beams and dollies associated therewith realigned generally perpendicularly with respect to the primary support beam and further illustrating the repositioning of the implements relative to one another.

With continued reference to the drawing figures, the tow bar assembly 10 of the present invention is illustrated in FIG. 1 as being secured to the three point hitch "H" associated with a conventional tractor "T". Power for manipulating the tow bar assembly, as well as for driving motors associated with some embodiments thereof, is obtained by connecting hydraulic lines to the hydraulic control circuit "C" associated with the tractor. A more detailed discussion of the fluid circuit will be described in greater detail hereinafter.

The present invention is designed to be utilized to simultaneously tow a plurality of agricultural implements, such as hay balers, by a single tractor. In this respect, the invention will be described with respect to the use of three hay balers, shown at HB1, HB2 and HB3 in the drawing figures. In some instances, it may be desired to use only one or two hay balers HB1 and HB2 in combination with the tow bar assembly. In addition to the foregoing, the present invention is also specifically designed to be effectively utilized to tow either lightweight implements which are generally not self-powered and which thus must receive driving power from a power source associated with a tractor, or to tow heavier implements, such as round hay balers, which include their own power sources but which require electrical controls from the cab of the tractor.

In FIG. 1, the hay balers HB1 and HB2 are shown as being round hay balers of the type which include their own power sources or motors "M" and thus do not require a separate input for purposes of driving the hay balers during use but which include electrical control circuits 15 which may be interconnected through appropriate electrical cables 17 to an electrical interface panel 18 mounted to the primary support frame 20 of the tow bar assembly. The electrical interface panel 18 is connected through a primary control cable 22 to appropriate electrical controls within the cab of the tractor. For purposes of example, the implement or hay baler HB3 is shown as being of the non-self-powered type, thus requiring input from a drive shaft 23 which is connected by way of a universal 24 to the drive mechanism (not shown) of the hay baler.

As opposed to being a round hay baler, the baler HB3 may be a square baler. Each of the balers includes a hitch tongue 25 which is designed to be connected to the tow bar assembly as will be described in greater detail hereinafter.

The primary support beam 20 is preferably formed of a generally hollow metal material of rectangular cross-section and includes a generally central portion and opposite end portions 26 and 27. The central portion of the primary support beam 20 is further reinforced by an auxiliary beam 28 which is mounted in generally parallel spaced relationship thereto and which is connected to the central portion by means of a pair of spaced outer plates 29 which are welded to both the auxiliary and primary support beams.

Extending from the front wall of the primary support beam are a pair of spaced mounting brackets 31 and 32 which are designed to be engaged with the lower hitch links of the three point hitch "H" of the tractor. The upper hitch link of the tractor is connected to a pair of spaced brackets 33 mounted to the auxiliary support beam 28. Utilizing the three point hitch of the tractor, portions of the tow bar assembly may be raised for transport.

At each of the ends 26 and 27 of the primary support beam 20 are a pair of outwardly extending upper and lower plates 36 and 37 which are welded to the upper and lower walls of the support beam, respectively. Outrigger beams 38 and 39, which are also formed of a generally rectangular cross-sectional tubular steel or other metal material, are pivotally mounted by pivot pins 40 between the upper and lower plates 36 and 37 so that the outrigger beams 38 and 39 may be pivoted relative to the primary support beam 20. The outrigger beams 38 and 39 may be pivoted from a generally aligned relationship with elongated axis "A—A" of the primary beam, as shown in FIG. 1, to any selected angular relationship generally rearwardly with respect to the primary support beam. In FIG. 2, the outrigger beams 38 and 39 are shown as being oriented generally perpendicularly with respect to the primary support beam.

The tow bar assembly 10 includes a pair of ground-engaging wheels 42 and 43 which are mounted to vertical struts 44 and 45 connected to brackets secured to the upper and lower plates 36 and 37 adjacent the opposite ends 26 and 27 of the primary support beam. The angular positioning of each of the outrigger beams 38 and 39 is controlled by various actuation means which may be incorporated with the tow bar assembly. In the preferred embodiment, the actuation means are hydraulic cylinders 50 and 51 which are pivotally mounted at 52 and 53 to brackets 54 and 55 which are welded or otherwise secured to the primary support beam adjacent the central portion thereof. The cylinders 50 and 51 are oriented in a generally parallel relationship with respect to the primary support beam when the outrigger beams 38 and 39 are generally aligned parallel to the elongated axis "A—A" of the primary support beam. Each hydraulic cylinder 50 and 51 includes an extension rod 56 and 57 which is pivotally mounted at 58 and 59, respectively, to brackets 60 and 61 which may be fixedly secured or adjustably mounted along the length of the outrigger beams 38 and 39. When the hydraulic cylinders are activated so as to urge the extension rods 56 and 57 to a fully retracted position, as shown in FIG. 2, the outrigger beams 38 and 39 are moved to a position wherein they are oriented generally perpendicularly rearwardly of the primary support beam.

The present invention is specifically designed to enable a single tow bar assembly to manipulate a plurality of self-powered, and therefore larger and heavier, farm implements and especially hay balers, such as shown at HB1 and HB2. In keeping with the teachings of the invention, all three of the implements to be towed by the tow bar assembly may be self-powered implements or, in the alternative, all three or any one or two implements may be of the lighter weight type requiring an exterior drive input, such as shown at 23 in FIG. 1.

To enable larger equipment to be stabilized when being pulled by the tow bar assembly in the preferred embodiment, the present invention incorporates a plurality of dollies 64, 65 and 66, each of which is supported by at least one ground-engaging wheel. As shown in the drawing figures, it is preferred that each dolly includes a frame including a cross-beam 67 from which extends spaced vertical struts 68 and 69, each of which is connected by a stub shaft or axle at the lower end thereof to a pair of spaced wheels 70 and 71, respectively. Reinforcing flanges 72 and 73 are provided between the cross beam and each of the struts 68 and 69.

With specific reference to FIGS. 5 and 6, each of the dollies further includes a pair of rearwardly extending hitch plates 74 and 75 having aligned openings therein for receiving a hitch pin 76 by way of which the dollies are connected to the hitch tongue 25 of an implement in such a manner that the hitch tongue of the implement is pivotable in a horizontal plane about the pin 76. Due to the weight of the implements and the amount of load which is placed on the hitch tongue 25 when the tow bar assembly is in use, it is necessary that the dollies follow the natural contour of the surface over which the implements are being used. In this respect, each dolly includes a universal pivot joint or swivel 78 by way of which the dolly is secured to either one of the outrigger beams 38 or 39 or to the primary support beam 20 of the tow bar assembly.

As shown in the drawing figures, the dolly 64 is connected to the outer end portion of the outrigger beam 38 and dolly 66 is mounted to the outer end portion of outrigger beam 39 while dolly 65 is mounted generally centrally of the primary support beam 20. To provide necessary pivotal movement between each dolly and a respective outrigger beam or primary support beam, each of the universal joints includes a pin 79 which extends through the cross beam 67 thereof to which the base 80 of the generally U-shaped swivel hitch joint 78 is rotatably mounted. The pivot includes parallel plates 81 and 82. The end of the pin 79 is bolted or otherwise secured in such a manner that the base 80 of the hitch joint is rotatable about the horizontal axis defined by the pin 79. Each of the plates 81 and 82 has an aligned opening therein, as shown at 83 and 84, for purposes of receiving a hitchpin 85 which is mounted through an opening in the associated outrigger beam 38 or 39 or the primary support beam 20. The universal swivel hitch 78 permits the dolly to both pivot about a horizontal axis relative to either the outrigger beams or the primary support beam and to further pivot about a vertical axis relative thereto so that the dolly wheels may track the terrain over which an implement is being pulled and thereby reduce the tongue weight on the tow bar assembly. With specific reference to FIG. 3, the dolly 64 is shown as being pivoted about the horizontal pin 79 in order to allow the wheels 70 and 71 to follow the contour of the ground.

With specific reference to FIG. 7, it should be noted that when the hydraulic cylinders 50 and 51 are activated to retract the cylinder rods 56 and 57 in order to move the outrigger arms 38 and 39 to a more perpendicular relationship with respect to the main support beam 20, the mounting brackets 60 and 61 are spaced a sufficient distance relative to the dollies 64 and 66 so as to not interfere with the movement of the dollies to a trailing position as shown in FIG. 2 of the drawing figures.

As previously discussed, the present invention may be utilized either with self-powered or non-powered implements. FIGS. 7 and 8 show the tow bar assembly without any type of motors for powering an agricultural implement, whereas FIGS. 1 and 2 disclose the mounting of motors for purposes of driving implements. In these embodiments, brackets 86 are mounted to the upper control portion of each of the cross-beams 67 of the dollies. Hydraulic motors 88, 89, 90 are mounted to the brackets 86 with each including a drive shaft 91, 92 and 93, respectively, which are connected to universal couplers 94, 95 and 96 which engage the outer end portions of input drive shafts, such as shown at 23 in FIG. 1. Due to the universal couplers, it is possible to drive the input shafts 23 regardless of the orientation of the hydraulic motor pumps 88, 89 and 90 relative to the hay balers, such as shown at HB3. It should be noted that the angular orientation of the input shafts 23 varies dependent upon the angular relationship of the dollies relative to the implement.

To supply fluid power to the hydraulic motors 88–90, the tow bar assembly 10 is designed to provide a source of hydraulic fluid. In this respect, mounted adjacent each of the opposite ends of the primary support beam are a pair of hydraulic fluid tanks 100 and 102 which are designed to hold sufficient hydraulic fluid for the operation of the various motors. Tank 100 includes a fluid inlet 103 from which hydraulic fluid is received from a filter 104 by way of a flow line 105. The filter 104 is connected by a hydraulic lines 106 and 106' extending from the outlet of hydraulic motors 88 and 89. Hydraulic tank 102 includes a fluid inlet 107 which is connected to a filter 108 by way of a fluid line 109. The filter 108 is connected to a hydraulic line 110 to the outlet of the motor 90. Both of the hydraulic tanks 100 and 102 have discharge outlets (not shown) which communicate the tanks with an interior chamber (not shown) defined within the primary support beam 20. The interior chamber thereby acts as a heat exchange reservoir for cooling the hydraulic fluid during the use of the tow bar assembly.

To supply hydraulic fluid to the motors 88–90, a hydraulic pump 112 is mounted between the primary support beam and the auxiliary beam, such as shown in FIGS. 3, 4 and 7. Hydraulic lines are provided for connecting the pump to the chamber within the primary support beam 20. The fluid is discharged through the motor by way of hydraulic lines 113, 114 and 115 to the motors. To control the hydraulic pumps, valves 116 and 117 are placed within the fluid circuit adjacent to the filters 104 and 108 for regulating the rate of fluid flow through the circuit.

Hydraulic fluid for operating the hydraulic cylinders 50 and 51 is provided directly from the hydraulic control circuits "C" associated with the tractor. In this respect, hydraulic cylinder 50 is connected by hydraulic lines 120 and 121 to the control circuit "C" and hydraulic cylinder 51 is connected to hydraulic lines 122 and 123. As these lines are directly connected to the tractor's control circuit, the tractor operator may control the extension and retraction of the rods associated with the cylinders from the cab of the tractor. Power for the hydraulic pump 112 is obtained using a drive connection 130 from the power takeoff of the tractor.

In use of the tow bar assembly of the present invention, one or more farm implements, particularly hay balers, either self-powered or non-powered, may be secured to the tow bar assembly. Generally, after hay or other forage material has been cut and harvested, it is raked into windrows which may vary in spacing, depending upon field conditions and other parameters. The present invention allows up to three windrows to be baled simultaneously. The general overall width of the unit when the outrigger beams are expanded, such as shown in FIG. 1, is approximately 16 feet with the outside dollies adding an additional three to four feet to each end. By the operator manipulating the hydraulic cylinders 50 and 51, the spacing between the outer hay balers or implements and the central implement may be adjusted. The universal joints associated with each of the dollies allows the implements to follow the contour of the land.

Although not specifically noted, in one embodiment of the invention, the intermediate dolly may be dispensed with and a conventional or universal hitch, as previously discussed, may be supplied directly to the primary support beam 20. In this embodiment, either one or both of the outer dollies would be utilized with the tow bar assembly. Also, motor 89 could be mounted directly to the primary support beam. In a like manner, if the dollies 64 and 66 are not in use, the motors 88 and 90 could be mounted to the outrigger beams.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. A tow bar assembly for use in operatively connecting a plurality of agricultural implements having hitch tongues to the hitch of a tractor having a source of power supply, the tow bar assembly comprising, a primary support beam having opposite end portions and a central portion, means mounted to said primary support beam for mounting said primary support beam to the tractor hitch, a pair of outrigger beams, pivot means for pivotally mounting an inner end portion of each said outrigger beams to said opposite end portions of said primary support beam, means for pivoting each of said outrigger beams about said pivot means, each of said means for pivoting including a first end pivotally mounted to said primary support beam and a second end pivotally mounted to one of said outrigger beams, at least one dolly, and means for pivotally connecting said at least one dolly to one of said outrigger beams, said at least one dolly including a frame supported by at least one ground engageable wheel and a hitch member adapted for selectively pivotally connecting the hitch tongues of an agricultural implement thereto whereby an implement hitched to said at least one dolly is pivotally connected to the tow bar assembly so as to follow the contour of the ground over which the implement is pulled.

2. The tow bar assembly of claim 1 including a second dolly, means for pivotally connecting said second dolly to the other of said outrigger beams, said second dolly including a frame supported by at least one ground engageable wheel and a hitch member adapted for selectively pivotally connecting the hitch tongue of an agricultural implement thereto.

3. The tow bar assembly of claim 2 including a means mounted to said central portion of said primary support beam and extending therefrom adapted to be connected to the hitch tongue of an agricultural implement.

4. The tow bar assembly of claim 3 in which said means mounted to said central portion includes a third dolly, means for pivotally connecting said third dolly to said primary support beam, said third dolly including a frame supported by at least one ground engageable wheel and a hitch member adapted for selectively pivotally connecting the hitch tongue of an agricultural implement thereto.

5. The tow bar assembly of claim 3 including at least one support wheel mounted to said primary support beam.

6. The tow bar assembly of claim 3 wherein each of said at least one and second dollies each include a pair of ground engageable wheels.

7. The tow bar assembly of claim 6 wherein each of said means for pivoting each of said outrigger beams includes a hydraulic cylinder pivotally mounted to said primary support beam and having a piston rod extending outwardly and pivotally connected to one of said outrigger beams, and means for supplying hydraulic fluid to each of said hydraulic cylinders.

8. The tow bar assembly of claim 3 in which each of said means for pivotally connecting said at least one dolly and said second dolly include a pivot connection allowing pivot motion about both a horizontal and a vertical axis.

9. The tow bar assembly of claim 8 wherein each of said pivot connections includes a swivel assembly for allowing said at least one dolly and said second dolly to pivot about a horizontal axis relative to said outrigger beams, each of said swivel assemblies being connected to vertical pivot pin members for allowing said swivel assemblies to be moveable about a vertical axis relative to said outrigger beams.

10. The tow bar assembly of claim 8 including at least one motor means mounted to at least one of said dollies said at least one motor means having an output shaft adapted to be connected to a drive input of an agricultural implement, and means for connecting said motor means to a source of power supply.

11. The tow bar assembly of claim 10 in which said at least one motor means is a hydraulic motor, at least one hydraulic fluid tank mounted to said primary support beam, said source of power supply including pump means for circulating fluid within said at least one hydraulic fluid tank to said hydraulic motor.

12. The tow bar assembly of claim 11 including a motor means mounted to each of said dollies, each of said motor means being connected to said source of power supply.

13. The tow bar assembly of claim 1 in which said means for pivotally connecting said at least one dolly includes a pivot connection allowing pivot motion about both a horizontal and a vertical axis.

14. The tow bar assembly of claim 13 wherein said pivot connections include a swivel assembly for allowing said at least one dolly and said second dolly to pivot about a horizontal axis relative to said one of said outrigger beams, said swivel assembly being connected to vertical pivot pin members for allowing said swivel assembly to be moveable about a vertical axis relative to said one of said outrigger beams.

15. The tow bar assembly of claim 13 including at least one motor means mounted to said at least one dollies, said at least one motor means having an output shaft adapted to be connected to a drive input of an agricultural implement, and means for connecting said motor means to a source of power supply.

16. The tow bar assembly of claim 13 wherein said at least one dolly includes a pair of ground engaging wheels.

17. A baling implement for simultaneously baling forage material and a plurality of rows and which is attachable to a tractor having a power source, the baling implement comprising:

a plurality of balers, each of said balers having a hitch tongue, a primary support beam having opposite ends and a central portion, means mounted to said central portion of said primary support beam for mounting said primary support beam to the tractor hitch, a pair of outrigger beams, pivot means for pivotally mounting an inner end portion of each said outrigger beams to said opposite ends of said primary support beam, means for pivoting each of said outrigger beams about said pivot means, each of said means for pivoting including a first end pivotally mounted to said primary support beam and a second end pivotally mounted to said outrigger beams, means for connecting at least one of said outrigger beams to the hitch tongue of one of said plurality of said balers, said means for connecting including at least one dolly having a frame supported by a pair of spaced ground engageable wheels and a joint connecting said dolly to said one of said outrigger beams to permit pivotal movement about both a horizontal and a vertical axis with respect thereto.

18. The tow bar assembly of claim 17 includes means for connecting one of said plurality of balers to each of said outrigger beams.

19. The tow bar assembly of claim 18 including means for connecting another of said plurality of balers to said primary support beam.

20. The tow bar assembly of claim 19 wherein said means for connecting another of said plurality of balers includes a dolly having a frame supported by a pair of spaced ground engaging wheels and a joint mounting said dolly to said primary support beam to permit pivotal movement about both a horizontal and a vertical axis with respect thereto.

* * * * *